(12) United States Patent
Euston

(10) Patent No.: US 8,876,525 B2
(45) Date of Patent: Nov. 4, 2014

(54) METHOD AND APPARATUS FOR REMOVING DUST PARTICULATES FROM PREHEATED PARTICULATE MATERIAL

(75) Inventor: Charles Euston, Bethlehem, PA (US)

(73) Assignee: FLSmidth Inc., Bethlehem, PA (US)

(*) Notice: Subject to any disclaimer, the term of this patent is extended or adjusted under 35 U.S.C. 154(b) by 783 days.

(21) Appl. No.: 13/002,808

(22) PCT Filed: Jul. 8, 2009

(86) PCT No.: PCT/US2009/003987
§ 371 (c)(1),
(2), (4) Date: Jan. 6, 2011

(87) PCT Pub. No.: WO2010/005563
PCT Pub. Date: Jan. 14, 2010

(65) Prior Publication Data
US 2011/0117510 A1      May 19, 2011

Related U.S. Application Data

(60) Provisional application No. 61/135,181, filed on Jul. 18, 2008.

(51) Int. Cl.
*F27B 7/36* (2006.01)
*F27B 1/00* (2006.01)
*C04B 2/12* (2006.01)

(52) U.S. Cl.
CPC .. *F27B 1/005* (2013.01); *C04B 2/12* (2013.01)
USPC .................. 432/16; 432/14; 432/86

(58) Field of Classification Search
CPC ................. C04B 7/432; C04B 7/475
USPC ............. 432/27, 86, 96, 14, 16; 423/173, 175
See application file for complete search history.

(56) References Cited

U.S. PATENT DOCUMENTS

| | | | |
|---|---|---|---|
| 3,954,391 A * | 5/1976 | Gottlieb | 432/14 |
| 4,089,697 A | 5/1978 | Pennell | |
| 4,256,451 A | 3/1981 | Johnson, Jr. | |
| 4,286,944 A | 9/1981 | Labriot et al. | |
| 6,691,628 B2 | 2/2004 | Meyer et al. | |
| 2005/0069832 A1* | 3/2005 | Townsend et al. | 432/136 |
| 2009/0084290 A1 | 4/2009 | Ichihara et al. | |

OTHER PUBLICATIONS

Written Opinion of the International Searching Authority for PCT/US2009/03987 dated Aug. 27, 2009.
International Search Report for PCT/US2009/03987 dated Aug. 27, 2009.

* cited by examiner

*Primary Examiner* — Kang Hu
*Assistant Examiner* — John Bargero
(74) *Attorney, Agent, or Firm* — Buchanan Ingersoll & Rooney PC

(57) ABSTRACT

A method for removing sulfur containing dust particles from particulate material exiting a material preheater in which the particulate material is heated by kiln off gases may include a number of steps. Off gases from the kiln are directed through a gas conduit to the preheater to preheat particulate material traveling through the preheater in a direction countercurrent to the direction of off gas flow through the preheater. Material exiting the preheater is directed to a material bypass conduit that is separated from the gas conduit and is flow connected to a material inlet to the kiln. A stripping gas is directed through the conduit to entrain dust particles in the preheated material and to carry said dust particles away from the preheated material.

19 Claims, 2 Drawing Sheets

METHOD AND APPARATUS FOR REMOVING DUST PARTICULATES FROM PREHEATED PARTICULATE MATERIAL

CROSS-REFERENCE TO RELATED APPLICATIONS

This application is the United States national stage under 35 U.S.C. §371 of International Application No. PCT/US2009/003987, filed on Jul. 8, 2009, claiming priority to U.S. Provisional Patent Application No. 61/135,181, filed on Jul. 18, 2008. Both of those applications are incorporated by reference herein.

BACKGROUND OF THE INVENTION

This invention relates to a method and system for preheating particulate material and, more particularly, to an improved method and apparatus for preheating particulate material.

The present invention is applicable generally to a process for preheating particulate material, and in particular to a process for preheating and precalcining limestone by flowing the limestone and the hot kiln gases from the calcining kiln in countercurrent heat exchange relationship to each other. A preheating apparatus of this general type is known.

In the conventional prior art apparatus and system for preheating, precalcining and calcining limestone, the limestone is supplied to an overhead storage bin and directed downwardly through a basically annular preheating and precalcining passage to a central discharge through which it passes to a calcining kiln. Hot kiln off gases flow in countercurrent heat exchange relation through at least the lower region of the annular preheating and precalcining passage before exhausting from the preheating apparatus.

It is known that the dust particles in preheated limestone are laden with sulfur and other impurities. It would be beneficial, therefore, and it is an object of the present invention, to have a system and a method for removing such dust laden particles from particulate limestone before the limestone enters the kiln.

SUMMARY OF THE INVENTION

The present invention is an improved method and apparatus for preheating particulate material and in particular from removing sulfur containing dust from the preheated material prior to the preheated material entering a calcining kiln.

The present invention utilizes an apparatus for preheating particulate material prior to the material being directed to a calcining kiln. In a standard preheating apparatus, the material is preheated by having the material and the hot kiln gases from the calcining kiln in countercurrent heat exchange relationship to each other. The preheated material is thereafter delivered into a centrally located outlet and then to a transfer passage and finally into the kiln's inlet. In a typical preheating apparatus the transfer passage serves to transfer both the particulate material from the preheater to the kiln and also the kiln off gases from the kiln to the preheater.

It is a feature of the present invention that there are two transfer passages between the preheater and the kiln: (i) a material bypass into which the material is delivered in which a stripping high velocity gas stream is directed which strips off the contaminant containing dust particles from the preheated particulate material and (ii) a gas conduit through which kiln off gases move from the kiln to the preheater.

BRIEF DESCRIPTION OF THE DRAWINGS

For a complete understanding of the present invention, reference can be made to the detailed description which follows and to the accompanying drawings in which.

Figure 1:
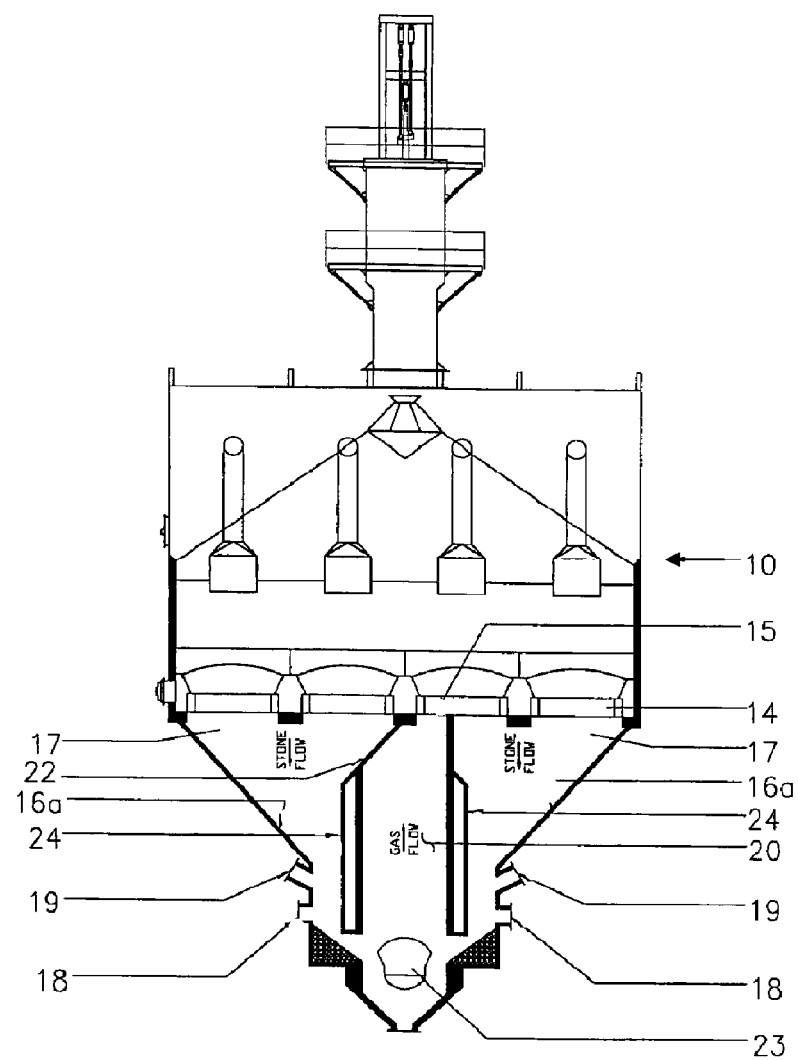
FIG. 1 is an elevational view of a preheater incorporating the present invention shown partly in cross section and with portions of the exterior wall broken away.
Figure 2:
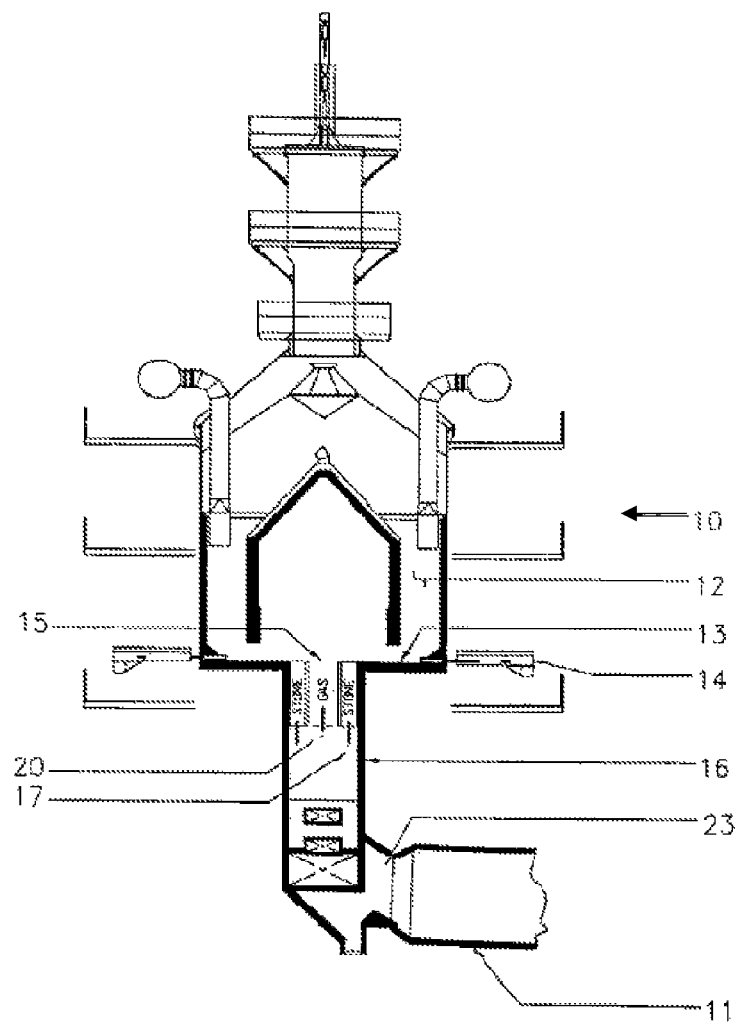
FIG. 2 is an elevational side view of a preheater of FIG. 1, also shown partly in cross section and with portions of the exterior wall broken away.

The drawings are not necessarily drawn to scale.

Similar numbers in the various figures refer to similar elements.

DETAILED DESCRIPTION OF THE INVENTION

The apparatus for preheating and precalcining particulate material, typically limestone, includes an upright preheating structure 10. The purpose of the preheater is to remove heat from the exhaust air leaving the kiln while at the same time preheating the limestone. Any preheater in which the preheating step is accomplished by having the particulate material and the hot kiln gases from an adjacent calcining kiln 11 in countercurrent heat exchange relationship to each other is suitable for use in the present invention. The limestone preheater 10 is an attached piece of equipment to lime kiln 11 allowing the length of the kiln to be shortened and a higher efficiency to be achieved. The preheater 10 can be a number of shapes, including cylindrical, rectangular or polygon. In its most basic state it is composed of a floor, roof, and rams.

Limestone enters the preheater at the top and falls down through and is preheated and precalcined in the preheater 10. In a typical preheater the primary preheating section comprises an annular flow passage 12 that deposits the preheated particulate material in a pile onto a floor 13, which is typically sloped. The preheated and precalcined limestone is discharged uniformly down the floor and into the discharge 12 by the reciprocatory motion of a plurality of ram plunger feeders 14 actuated in a predetermined sequence and timed to give appropriate feed to the kiln. The rams are pushed by hydraulic cylinders to slide the pile down a transfer chute into the kiln. In flowing downwardly through the annular preheater and precalciner, the limestone is preheated and precalcined by the countercurrent flow of the hot kiln gases which flow upwardly through the limestone to preheat and precalcine the limestone prior to its discharge from the preheater at discharge point 15 and its introduction into the kiln at kiln inlet 16.

The centrally located discharge 12 communicates through a transfer conduit 16 with a rotary kiln 11. In a standard preheater/kiln system the limestone exiting the preheater at discharge point 15 falls by gravity through the transfer conduit 16 while hot kiln gases from the kiln 11 flow in countercurrent direction up through the transfer conduit and through discharge point 15 into the preheater.

It is a feature of the present invention that upon exiting the preheating at discharge point 15 the material is diverted, such as for example via impact plates 22, into a material bypass 17 into which a stripping gas is introduced at one or more gas inlets 18 at a velocity sufficient to entrain any small dust particles in the limestone but insufficient to prevent larger limestone particles from falling unimpeded to the lower end of said bypass 17 by the force of gravity and thereafter into kiln 11. The stripping gas, along with any entrained dust, will exit the material bypass 17 at one or more gas outlets 19. The dust will thereafter be separated from the stripping gas and suitably treated or disposed of. For example, a separator may be used to separate the dust from the stripping gas. As may be appreciated by those of at least ordinary skill in the art, a dust separator, a cyclone or a high performance cyclone may be examples of such a separator. In some embodiments, a conduit may be connected between the separator and the preheater.

The stripping gas is preferably heated so that the preheated material that continues on to the kiln is not cooled to any significant degree, although the contact time between the stripping material and the particulate material that is not entrained is typically not significant. The lower end of material bypass 17 will be in communication with kiln material inlet 23.

In the preferred embodiment of the invention all of the particulate material that exists preheater 10 will enter material bypass 17. However, in another embodiment of the invention a portion of the material may instead fall through inner gas conduit 20 in countercurrent direction to the off kiln gas flowing through said conduit.

While a separate source of air or gas may be utilized in the dust stripping operation, a portion of the kiln off gases or other plant gases may be redirected through a fan to increase velocity and thereafter into inlet 18.

The hot kiln gases will rise upward through an inner gas conduit 20 which is located within transfer conduit 16 and is separate from material bypass 17 and thereafter into preheater 10. Therefore, within essentially the entire height of the transfer conduit 16, the hot kiln gases and the preheated limestone will move in opposite directions essentially without intermixing.

Material bypass 17 will preferably be an annular passageway which (a) surrounds inner gas conduit 20 and (b) is adjacent to the inner wall 16a of transfer conduit 16. The specific shape of the material dust stripping bypass is not crucial to the invention. For example, the material bypass can be, among other shapes, square, rectangular or round in its horizontal cross-section.

The walls 24 of inner gas conduit 18 are impervious to gas to thereby maintain the separation between the kiln off gases and the particulate material. The kiln gas will thereafter enter the preheater at discharge point 15.

Therefore, in one embodiment of the invention, transfer conduit 16 is subdivided into two conduits, material bypass 17 and inner gas conduit 20. Alternatively, but not preferably, the material bypass may be located outside of transfer conduit 16.

The invention has been shown in a single preferred form and by way of example only, and many variations and modifications can be made therein within the spirit of the invention. The invention, therefore, should not be limited to any specified form or embodiment except in so far as such limitations are expressly set forth in the claims.

What is claimed is:

1. A method for removing sulfur containing dust particles from particulate material exiting a material preheater in which the particulate material is heated by kiln off gases comprising:
    directing off gases from a kiln through a gas conduit and into said preheater to preheat particulate material traveling through said preheater, the off gases from the kiln flow in a direction countercurrent to a direction of material flow through a material bypass conduit from said preheater;
    directing said preheated material exiting said preheater to the material bypass conduit separated from said gas conduit such that preheated material passing through the material bypass conduit does not come into contact with the off gases from the kiln passing through the gas conduit, the material bypass conduit connected to a material inlet to the kiln such that preheated material passed through the material bypass conduit is feedable to the kiln;
    directing a stripping gas through said material bypass conduit such that the stripping gas passes in a direction that is opposite a direction to which the preheated material particles that are larger than the dust particles pass through the material bypass conduit, said stripping gas being directed through the material bypass conduit such that the stripping gas travels at a velocity within the material bypass conduit that entrains the dust particles of the preheated material without preventing the material particles that are larger than dust particles from falling through the material bypass conduit toward the inlet of the kiln via gravitational force; and
    removing the stripping gas with the entrained dust particles from the material bypass conduit via at least one outlet so that neither are fed to the inlet of the kiln nor reenter the preheater.

2. The method of claim 1 further comprising directing the stripping gas with the entrained dust particles from the material bypass conduit to a separator and separating the dust particles from the stripping gas via the separator.

3. A system for removing dust particles from preheated particulate material, comprising:
    a material preheater in which the particulate material is preheated by kiln off gases, said preheater having an outlet for preheated particulate material comprising dust particles and particles larger than the dust particles and an inlet for the kiln off gases;
    a kiln for calcining preheated particulate material, said kiln having an inlet for particulate material and an outlet for kiln off gases;
    a material bypass conduit through which at least a portion of the preheated material will fall by gravity in a direction towards the inlet of the kiln, the material bypass conduit communicating on its one end with a preheater outlet for the preheated particulate material and on its other end with the inlet of the kiln;
    at least one stripping gas inlet in communication with the material bypass conduit and at least one source of stripping gas to insert the a stripping gas into said material bypass conduit at a velocity sufficient to entrain dust particles of the preheated material passing through the material bypass conduit without preventing larger preheated material particles from falling via gravity through the material bypass conduit toward the material inlet of the kiln; at least one stripping gas outlet in communication with the material bypass conduit to withdraw the stripping gas and the dust particles entrained therein from the material bypass conduit, each stripping gas outlet being above the at least one stripping gas inlet such that the at least one stripping gas passes through the material bypass conduit in a flow direction that is opposite the direction at which particles larger than the dust particles fall through the material bypass conduit via gravity to the inlet of the kiln; and
    a gas conduit for kiln off gases connected to the outlet for kiln off gases and the inlet for kiln off gases of the preheater, wherein the gas conduit is separated from the material bypass conduit such that the kiln off gases passing through the gas conduit do not come into contact with the at least one stripping gas passing through the material bypass conduit and do not come into contact with the preheated particulate material passing through the material bypass conduit.

4. The system of claim 3 further comprising a dust separator connected to said at least one stripping gas outlet to receive the at least one stripping gas and the dust particles entrained therein for removing the dust particles from the stripping gas that passes through the at least one stripping gas outlet.

5. A method for removing sulfur from preheated material comprising dust particles having sulfur and larger particulate material after said preheated material exits a material preheater, the larger particulate material being larger than the dust particles, the method comprising:

directing off gases from a kiln into said preheater to preheat the particulate material, said off gases traveling through said preheater in a direction countercurrent to a direction of material flow through said preheater toward a material exit into a material bypass conduit, said off gases being directed from the kiln to the preheater via a gas conduit in a direction countercurrent to a direction of material flow through the material bypass conduit from said preheater;

stripping at least a portion of the dust particles from said preheated material after said preheated material exits the preheater and prior to said preheated material entering the kiln by directing a stripping gas through said preheated material as the preheated material passes through the material bypass conduit that is separate from the gas conduit through which the off gases flow, said stripping gas traveling at a velocity sufficient to entrain the dust particles but not the larger particulate material, said stripping gas traveling in a direction that is opposite a direction at which the larger particulate material falls through the material bypass conduit into the kiln, wherein said preheated material while in the material bypass conduit does not come in contact with the off gases from the kiln during said stripping step.

6. The system of claim 4 wherein said dust separator is a high performance cyclone.

7. The system of claim 4 further comprising a bypass conduit connected between the dust separator and the material preheater.

8. The method of claim 2 wherein the separator is a dust separator, a cyclone or a high performance cyclone.

9. The system of claim 3 wherein the gas conduit for kiln off gases and the material bypass conduit are subdivided portions of a transfer conduit connecting the material preheater to the kiln.

10. The system of claim 9 wherein the gas conduit for kiln off gases is positioned inside of the material bypass conduit and is separated from the material bypass conduit via a generally annular wall of the gas conduit for kiln off gases.

11. The system of claim 3 wherein the gas conduit for kiln off gases is a transfer conduit connecting the kiln to the material preheater and the material bypass conduit is located outside of the transfer conduit.

12. The system of claim 3 further comprising at least one material diverting mechanism connected to the preheater to divert the preheated material to the material bypass conduit.

13. The system of claim 12 wherein the at least one material diverting mechanism is comprised of at least one impact plate.

14. The method of claim 2 wherein at least one impact plate is used to direct said preheated material exiting the preheater to the material bypass conduit.

15. The method of claim 1 wherein the stripping gas is comprised of air or at least one gas from a plant that is passed through the material bypass conduit via at least one fan.

16. The system of claim 3 wherein the stripping gas is comprised of air or at least one gas from a plant that is passed through the at least one stripping gas inlet and the material bypass conduit via at least one fan.

17. The system of claim 3 wherein the stripping gas does not include the kiln off gases.

18. The method of claim 1 wherein the stripping gas does not include the kiln off gases.

19. The method of claim 5 wherein the stripping gas does not include the off gases from the kiln.

* * * * *